(12) United States Patent
Chang

(10) Patent No.: US 7,464,258 B2
(45) Date of Patent: Dec. 9, 2008

(54) METHOD OF DISPLAYING FOREGROUND VISUAL DATA IN FOREGROUND AND EXECUTING SYSTEM BOOTING IN BACKGROUND FOR COMPUTER SYSTEM

(75) Inventor: Wen-Hua Chang, Sinjhuang (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 455 days.

(21) Appl. No.: 11/242,825

(22) Filed: Oct. 5, 2005

(65) Prior Publication Data
US 2007/0022282 A1 Jan. 25, 2007

(30) Foreign Application Priority Data
Jul. 22, 2005 (TW) .............................. 94125023 A

(51) Int. Cl.
G06F 15/177 (2006.01)
(52) U.S. Cl. .............................................. 713/1; 713/2
(58) Field of Classification Search ...................... 713/2, 713/1, 100
See application file for complete search history.

(56) References Cited

U.S. PATENT DOCUMENTS

| | | | |
|---|---|---|---|
| 6,209,044 B1 * | 3/2001 | Vaughan ...................... 710/14 |
| 6,763,458 B1 | 7/2004 | Watanabe et al. |
| 6,788,352 B2 | 9/2004 | Kim |
| 6,873,333 B1 * | 3/2005 | Patel et al. ................... 345/530 |
| 2002/0024616 A1 * | 2/2002 | Kim ............................ 348/714 |
| 2002/0073305 A1 * | 6/2002 | Joseph et al. .................. 713/1 |
| 2004/0093489 A1 * | 5/2004 | Hsu .............................. 713/2 |
| 2004/0193868 A1 * | 9/2004 | Kuo ............................. 713/2 |

OTHER PUBLICATIONS

Communication from the German Patent Office regarding a corresponding German Patent Application 10 2005 060 541 dated Nov. 8, 2007.

* cited by examiner

Primary Examiner—Chun Cao
(74) Attorney, Agent, or Firm—Quintero Law Office

(57) ABSTRACT

Disclosed is a method of displaying foreground visual data in foreground and executing system booting in background for a computer system, including the following steps: a computer system detecting a pre-configured hot key being pressed; the computer system being activated and executing the BIOS; the BIOS loading and executing the monitor driver, and loading a default animation related to the applications associated with the pre-configured hot key; the monitor displaying the default animation while operating system being loaded and executed; and finally, after the initialization of the operating system, the application programs associated with the pre-configured hot key being loaded and executed.

8 Claims, 6 Drawing Sheets

| Hot Key | Event Code | Pre-configured Hot Key Application Program | Forground Visual Data | Audio Data |
|---|---|---|---|---|
| Hot Key#1 | Event Code#1 | Pre-configured Hot Key Application Program#1 | Forground Visual Data#1 | Audio Data#1 |
| Hot Key#2 | Event Code#2 | Pre-configured Hot Key Application Program#2 | Forground Visual Data#2 | Audio Data#2 |
| Hot Key#3 | Event Code#3 | Pre-configured Hot Key Application Program#3 | Forground Visual Data#3 | Audio Data#3 |

METHOD OF DISPLAYING FOREGROUND VISUAL DATA IN FOREGROUND AND EXECUTING SYSTEM BOOTING IN BACKGROUND FOR COMPUTER SYSTEM

FIELD OF THE INVENTION

The present invention relates to a computer system booting method and, more particularly, to a method of displaying foreground visual data in foreground and executing system booting in background for a computer system.

BACKGROUND OF THE INVENTION

As the multimedia applications become ubiquitous, the computers have also become a daily household appliance. For many users, the computers are a part of daily life. As a result, a concept of digital life with the computers at the core is gaining popularity. The integration of using computers in other household appliances to improve the functionality or the ease of use is no longer a remote concept. For example, the instant play function enables the user experience the same ease of use of computers as other simple appliances by using a fast embedded program; hence, the user can enjoy the instant play of multimedia during the booting of the system.

However, although the conventional instant play technology has greatly improved the booting speed, an obvious waiting period still incurs due to the difference between the computers and household appliances. The following disadvantages still exist: (1) the clear distinction between booting period and the ready-to-run period; (2) the booting period being wasted in waiting, instead of being utilized for informative instruction or commercial advertisement; and (3) the prolonged sense of waiting alienating the users and leading to low acceptance of computer-appliance integration.

SUMMARY OF THE INVENTION

The present invention is provided to overcome the aforementioned disadvantages of the conventional technologies. The primary objective of the present invention is to provide a method for execution of data displaying in foreground while the system booting in background. When a user boots a computer system, the BIOS of the computer loads a sequence of related animation of default application programs or other visual effects films to the monitor, and then the operating system takes over the activation operation of sequencing device and the activating the application programs.

Another objective of the present invention is to provide a method for utilizing the waiting period of system booting. By using smooth animation or visual effects film leading to the activation of applications and bringing the system up to the ready-to-use state, the user can see the progress of the system booting, and the sense of prolonged waiting is lessened.

Yet another objective of the present invention is to provide a method that improves the visual effects during the booting period without sacrificing the booting speed. The display of the sequence of default animation on the monitor does not affect the operating system initialization in the background.

To achieve the aforementioned objectives, the present invention provides a method of booting a computer system, including the following steps: a computer system detecting a pre-configured hot key being pressed; the computer system being activated and executing the BIOS; the BIOS loading and executing the monitor driver, and loading a default animation related to the applications associated with the pre-configured hot key; the monitor displaying the default animation while operating system being loaded and executed; and finally, after the initialization of the operating system, the application programs associated with the pre-configured hot key being loaded and executed.

In a preferred embodiment of the present invention, the memory system of the computer system is configured to include a random access hard-disk region to speed up the activation of the programs. Furthermore, the animation related to the programs may also include audio information related to the programs.

In comparison with the conventional methods, the present invention allows the BIOS of a computer system to load a sequence of animation related to the default application programs or other visual effects films to the monitor, and then the operating system takes over the activation operation of sequencing device and the activating the application programs. Therefore, when the user presses a pre-configured hot key to boot the computer system, the smooth animation or visual effects film leads to the activation of applications while the system is brought up to the ready-to-use state. The user can see the progress of the system booting, and the sense of prolonged waiting is lessened. Furthermore, the present invention improves the visual effects during the booting period without sacrificing the booting speed. The display of the sequence of default animation on the monitor does not affect the operating system initialization in the background. In practical application, the present invention can design the animation for various informative purposes.

These and other objectives, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein:

FIG. 5 shows the data of the related fields in the hot key mapping table of FIG. 3.

DETAILED DESCRIPTION OF THE PREFERRED EMBODIMENTS

Figure 1:
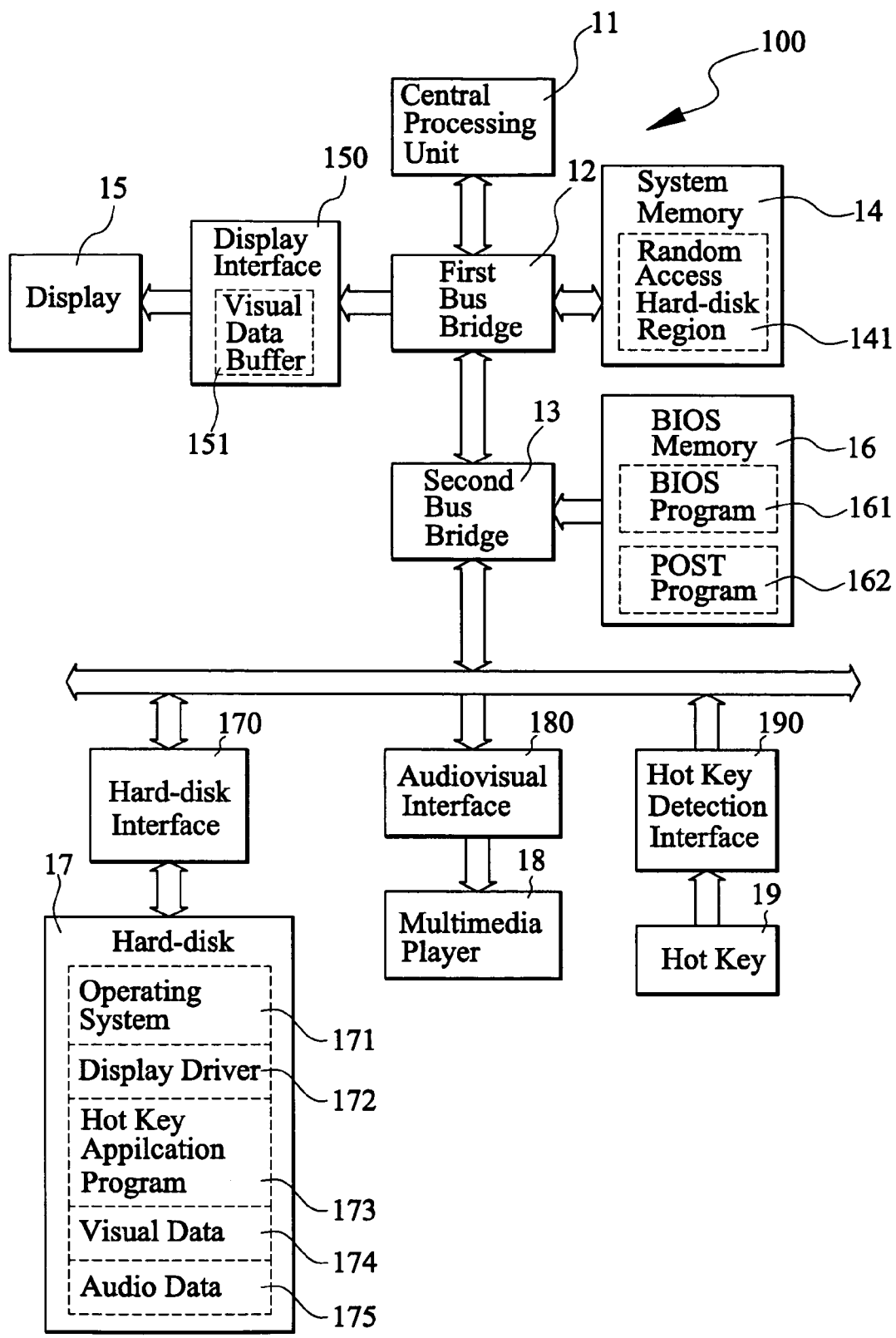
FIG. 1 shows a block diagram of a first embodiment of the method of the present invention.

With reference to the drawings and in particular to FIG. 1, which shows a functional block diagram of the first embodiment of the present invention, a computer 100 includes a central processing unit 11, a first bus bridge 12, and a second bus bridge 13. The central processing unit 11 is connected to the first bus bridge 12 through a system bus. The first bus bridge 12 is connected to a system memory 14 and connected to a display 15 through a display interface 150.

The second bus bridge 13 is connected to a basic input/output system memory 16 (BIOS memory). The BIOS memory 16 stores an BIOS program 161 and a power-on-self-test (POST) program 162, required by computer 100 during booting.

The second bus bridge 13 is connected to a hard-disk interface 170 through a bus. The hard-disk interface 170 is connected to a hard-disk 17. The hard-disk 17 served as a data storage device is for storing data in the present invention. The hard-disk 17 is installed with an operating system 171 and other drivers and applications working under the operating system environment, such as a display driver 172, a pre-configured hot key application program 173, and so on. The pre-configured hot key application 173 can be a multimedia player application. The hard-disk 17 also includes at least a foreground visual data 174 and an audio data 175 for playing.

The second bus bridge 13 is connected to a multimedia player 18 through an audiovisual interface 180. The multimedia player 18 can be a DVD, MP3, CD, or TV. The second bus bridge 13 can also be connected to other peripheral devices through other types of interfaces (not shown).

The second bus bridge 13 is connected to a hot key 19 through a hot key detection interface 190. The hot key 19 corresponds to a pre-configured hot key application program 173 pre-configured to the hot key. In other word, when the hot key 19 is pressed, the computer 100 detects the state of the hot key 19, and loads and executes the pre-configured hot key application program 173 stored in the hard-disk 17.

Figure 2:
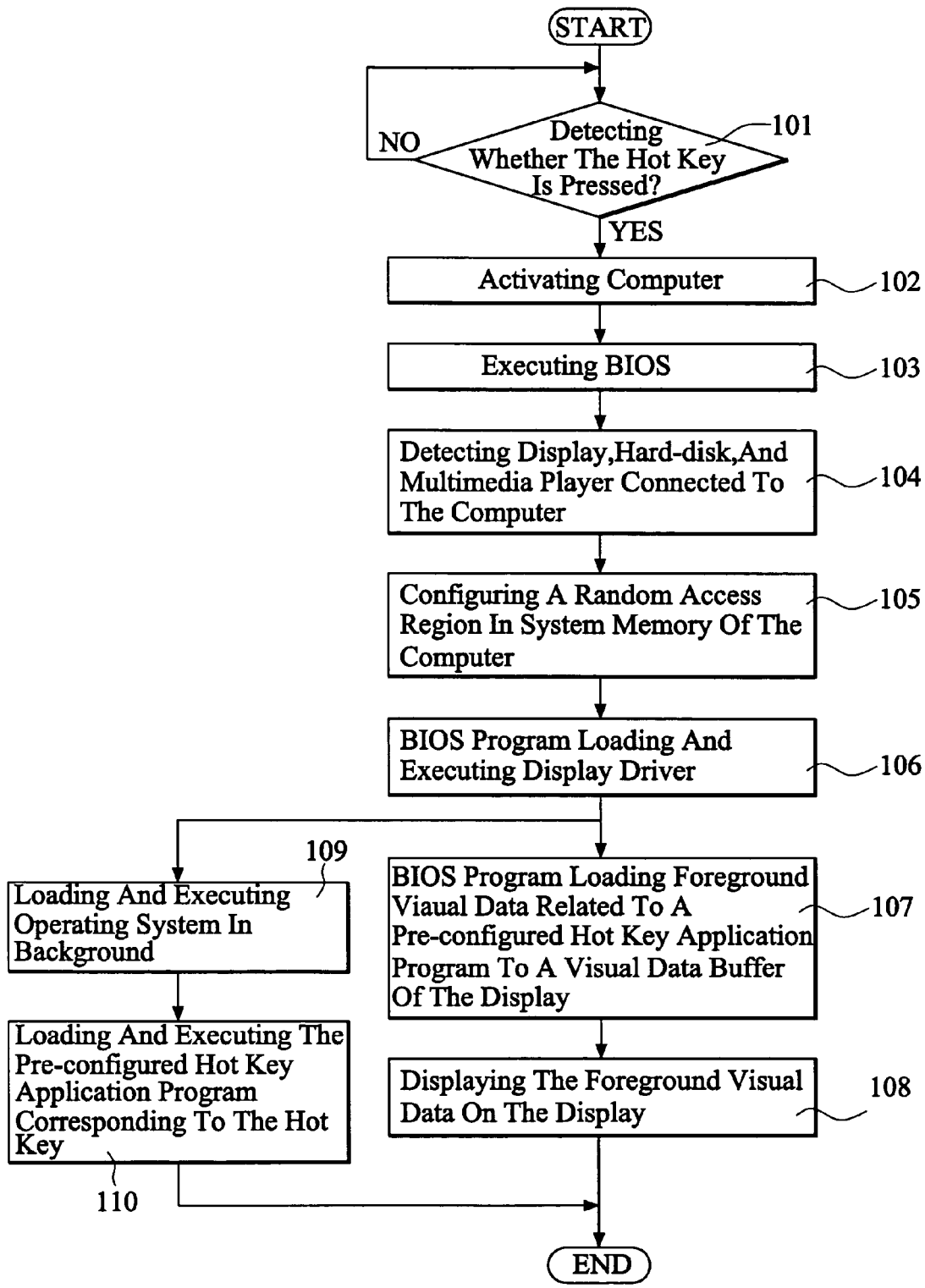
FIG. 2 shows a control flowchart of the method of the present invention.

FIG. 2 shows a control flowchart of the embodiment of the present invention. The following description refers to FIGS. 1 and 2.

In step 101, the computer 100 detects whether the hot key is pressed. When the hot key is pressed, the computer 100 is activated, as in step 102. The activation of the computer 100 can be booting the computer or awaking from a preset sleep mode. After the activation, the computer 100 executes the BIOS, as in step 103. That is, the central processing unit 11 loads the BIOS program 161 and the POST program 162 from the BIOS memory 16. Step 104 is for the BIOS program 161 to detect the devices connected to the computer 100, such as the display 15, the hard-disk 17, and the multimedia player 18.

Step 105 is to configure a random access hard-disk region 141 in the system memory 14 of the computer 100 for the space required for executing the operating system, the display driver and the hot key pre-configured application so that the execution speed can be improved.

Step 106 is for the BIOS program 161 to load and execute the display driver 172 so that the display 15 can start to operate. Step 107 is for the BIOS program 161 to load the foreground visual data 174 related to the pre-configured hot key application program 173 to a visual data buffer 151 of the display 15, and step 108 is for the display 15 to display the foreground visual data 174.

In the preferred embodiment of the present invention, the foreground visual data 174 can be a sequence of animation for product introduction, operation instruction, or advertisements. In the mean time, an audio data 175 can be played on the multimedia player 18 when during the display of the foreground visual data 174.

Step 109 is executed in parallel with step 107. Step 109 is to load and execute the operating system 171 stored in the hard-disk 17 in background in order to complete the initialization of the operating system. Step 110 is to load and execute the pre-configured hot key application program 173 corresponding to the hot key 19. When the pre-configured hot key application program 173 starts execution, the display 15 can stop the displaying of the foreground visual data 174.

The pre-configured hot key application program 173 associated with the hot key 19 can be a multimedia play program, and the hot key 19 can be configured to activate a button of the multimedia player. When the hot key 19 is pressed, the computer 100 executes the process.

Figure 3:
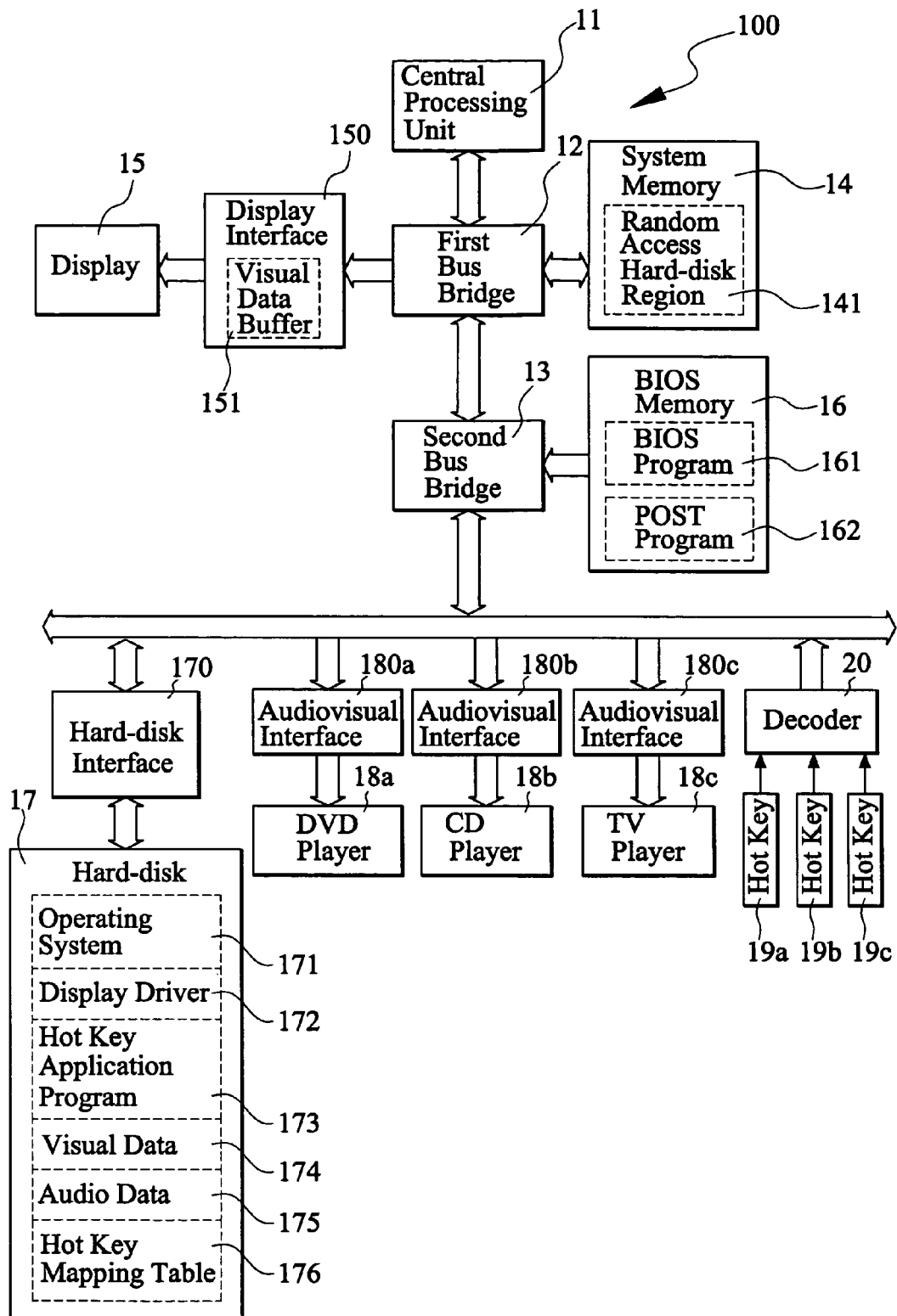
FIG. 3 shows a block diagram of a second embodiment of the method of the present invention.
Figure 4:
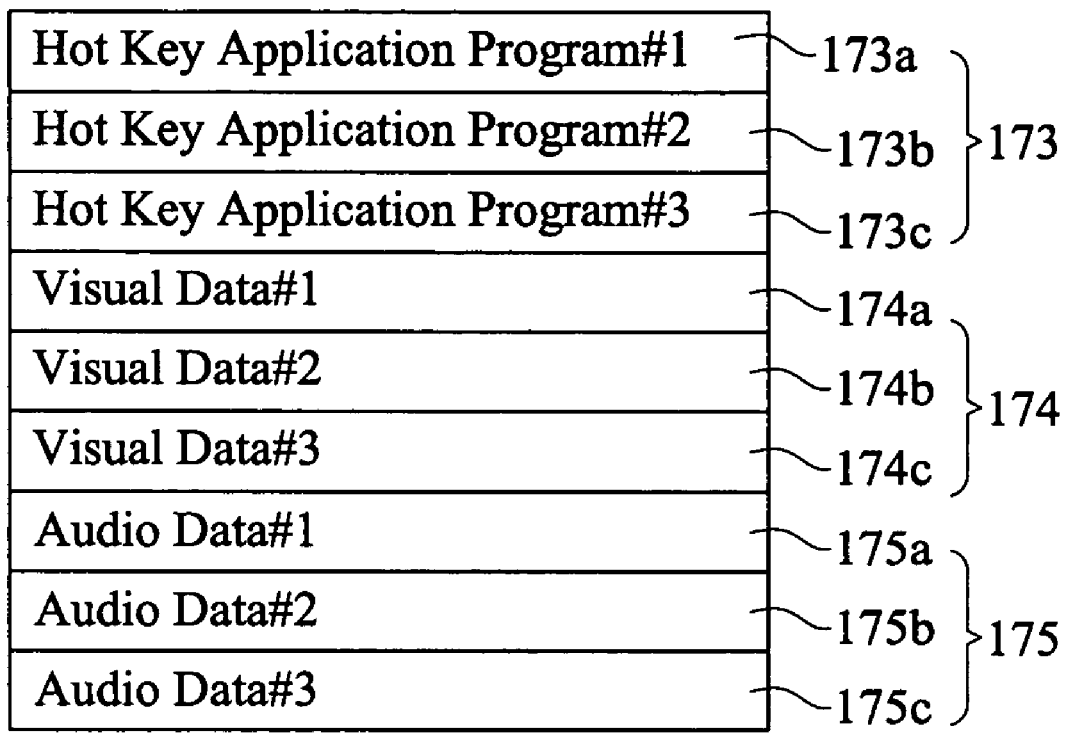
FIG. 4 shows a plurality of applications and related animation installed in a hard-disk of FIG. 3.

FIG. 3 shows a functional block diagram of a second embodiment of the present invention. In this embodiment, many of the blocks are similar to those of FIG. 1. The difference is that the second bus bridge 13 of the computer 100 is connected to a plurality of multimedia players, such as a DVD player 18a, a CD player 18b, a TV 18c, through interfaces 180a, 180b, 180c, respectively.

The second bus bridge 13 is connected to a plurality of hot keys 19a, 19b, 19c through a decoder 20. The hot keys 19a, 19b, 19c correspond to pre-configured hot key application programs 173a, 173b, 173c, respectively, and the pre-configured hot key application programs 173a, 173b, 173c correspond to the control of DVD player 18a, CD player 18b, TV 18c. The hard-disk 17 is installed with pre-configured hot key application programs 173a, 173b, 173c as well as associated foreground visual data 174a, 174b, 174c and audio data 175a, 175b, 175c.

The hard-disk 17 stores a hot key mapping table 176. FIG. 5 shows the data of the related fields of the hot key mapping table, including a plurality of hot keys 19a, 19b, 19c and corresponding event code #1, event code #2, event code #3, pre-configured hot key application program #1, pre-configured hot key application programs #2, pre-configured hot key application programs #3, foreground visual data #1, foreground visual data #2, foreground visual data #3, and audio data 31, audio data #2, audio data #3.

Figure 6:
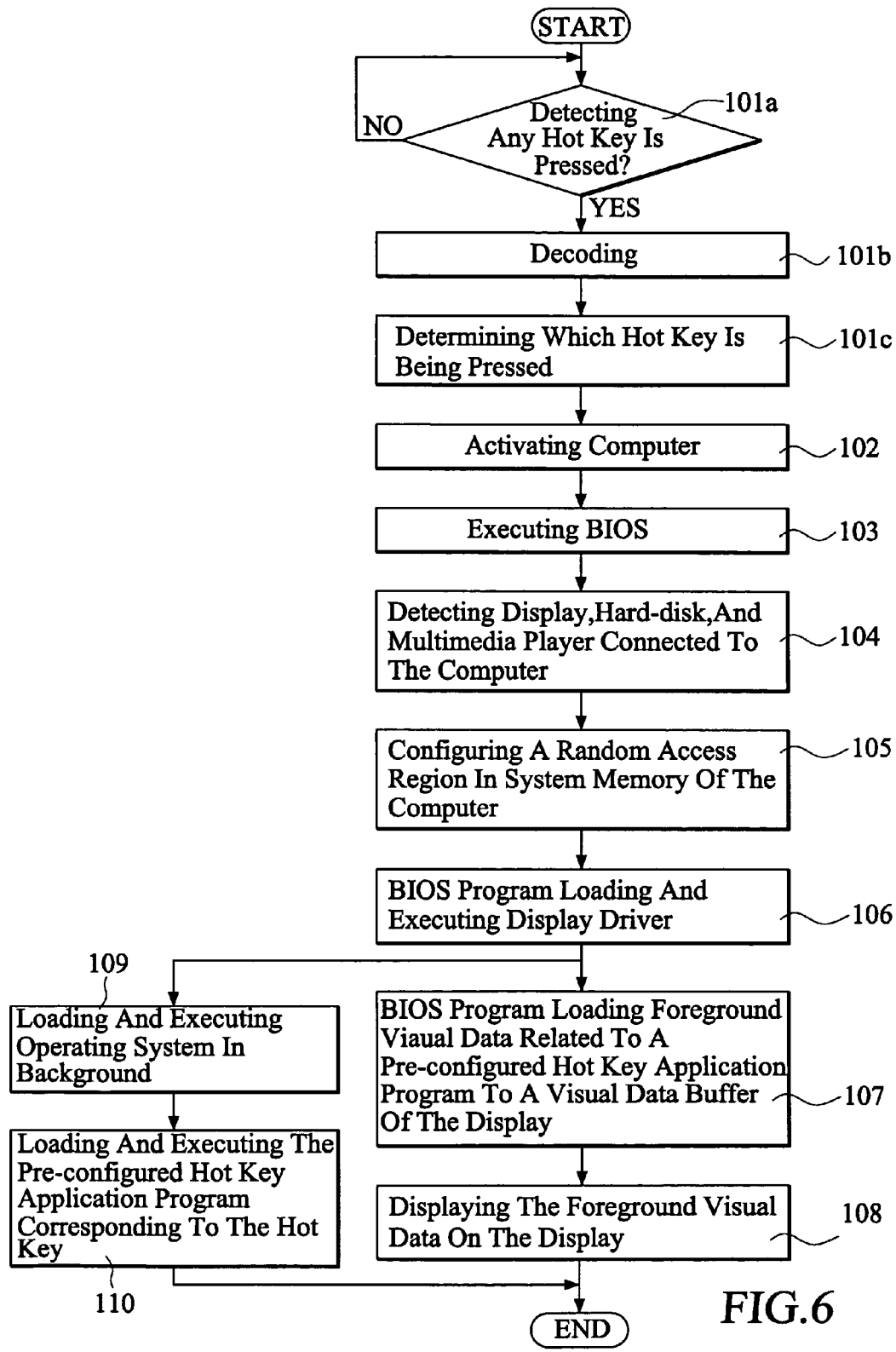
FIG. 6 shows a control flowchart of the second embodiment of the present invention.

FIG. 6 shows a control flowchart of the second embodiment of the present invention. Many steps of the flowchart are similar to those in FIG. 2. The difference is that the computer 100 detects any hot key 19a, 19b, 19c being pressed, as in step 101a, the decoder 20 decodes the detected hot key, as in step 101b, and the computer 100 determines which hot key is being pressed, as in step 101c. After that, step 102 to step 106 are identical to that in FIG. 2.

Step 107 is for the BIOS program 161 to load one of the foreground visual data 174a, 174b, 174c and one of the audio data 175a, 175b, 17c related to the pre-configured hot key application programs 173a, 173b, 173c to a visual buffer 151 of the display 15, and step 108 is for the display 15 to display one of the foreground visual data 174a, 174b, 174c.

Step 109 is executed in parallel with step 107. Step 109 is to load and execute the operating system 171 stored in the hard-disk 17 in order to complete the initialization of the operating system. Step 110 is to load and execute one of the pre-configured hot key application programs 173a, 173b, or 173c corresponding to the hot keys 19a, 19b, or 19c. When the pre-configured hot key application program 173a, 173b, or 173c starts execution, the display 15 can stop the displaying of the foreground visual data 174a, 174b, 174c.

While the invention has been described in connection with what is presently considered to be the best modes for carrying out the present invention and preferred embodiment of the present invention, it is to be understood that the invention is not to be limited to the disclosed embodiment and process, but on the contrary, is intended to cover various modifications and equivalent arrangement included within the spirit and scope of the appended claims.

What is claimed is:

1. A method of displaying foreground visual data in foreground and executing system booting in background for a computer system, the computer system having a data storage, a system memory, a basic input and output system (BIOS), a display and at least one hot key, the hot key mapping to a hot key application program and the hot key application program mapping to the foreground visual data, the data storage storing an operating system, a display driver, and at least one hot key application program, the method comprising the steps of:

(a) detecting a state of the hot key;
(b) activating the computer system responsive to detecting the hot key being pressed;
(c) executing the BIOS of the computer system;
(d) the BIOS loading and executing the display driver to drive the display;
(e) the BIOS loading the foreground visual data corresponding to the hot key application program mapped to the hot key, and the display displaying the foreground visual data in foreground;
(f) loading and executing the operating system in the background concurrently with step (e);
(g) loading and executing the hot key application program mapped to the hot key subsequent to initialization of the operating system being completed; and
(h) terminating display of the foreground visual data responsive to the execution of the hot key application program mapped to the hot key;

wherein the computer system includes a plurality of hot keys each mapped to a different application program and the data storage stores a hot key mapping table comprising a plurality of hot key mapping entries, and each entry comprises an event code, a hot key application program and corresponding foreground visual data mapped to the hot key.

2. The method as claimed in claim 1, wherein step (c) further comprises a step of configuring a random access harddisk region in the system memory of the computer system to provide space required for the execution of the operating system, the display driver and the hot key application program mapped to the hot key.

3. The method as claimed in claim 1, wherein the foreground visual data in step (c) is stored in the data storage.

4. The method as claimed in claim 1, wherein the foreground visual data is loaded by the BIOS to a visual data buffer of the display in step (e).

5. The method as claimed in claim 1, wherein step (e) includes the step of loading an audio data corresponding to the hot key application program for output concurrently with the foreground visual data.

6. The method as claimed in claim 1, wherein the foreground visual data is a sequence of animation.

7. The method as claimed in claim 1, wherein the hot key application program mapped to the hot key is a multimedia play program.

8. The method as claimed in claim 1, wherein each entry of the hot key mapping table further comprises an audio data corresponding to the application program mapped to the hot key.

\* \* \* \* \*